United States Patent [19]

Carlson

[11] 4,295,993

[45] * Oct. 20, 1981

[54] CATALYTIC COMPOSITE, METHOD OF MANUFACTURE AND PROCESS FOR USE

[75] Inventor: David H. J. Carlson, Park Ridge, Ill.

[73] Assignee: UOP Inc., Des Plaines, Ill.

[ * ] Notice: The portion of the term of this patent subsequent to Jun. 30, 1998, has been disclaimed.

[21] Appl. No.: 109,934

[22] Filed: Jan. 4, 1980

[51] Int. Cl.$^3$ .............................................. B01J 31/22
[52] U.S. Cl. ............................... 252/430; 252/431 N; 208/206; 208/207
[58] Field of Search ........................... 252/430, 431 N

[56] References Cited

U.S. PATENT DOCUMENTS

| | | | |
|---|---|---|---|
| 4,115,252 | 9/1978 | Antos | 252/441 X |
| 4,124,493 | 11/1978 | Frame | 252/431 N X |
| 4,157,312 | 6/1979 | Frame | 252/431 N X |
| 4,206,079 | 6/1980 | Frame | 252/431 N X |

*Primary Examiner*—Patrick Garvin

*Attorney, Agent, or Firm*—James R. Hoatson, Jr.; Louis A. Morris; William H. Page, II

[57] ABSTRACT

Disclosed are a metal chelate-alkali metal hydroxide-quaternary ammonium hydroxide, catalytic composite, a method of manufacturing the catalytic composite, and a process of treating sour petroleum distillates utilizing the catalytic composite. The catalytic composite comprises a metal chelate, a quaternary ammonium hydroxide, and an alkaline metal hydroxide disposed on a molecular sieve, the alkali metal hydroxide comprising at least about 10 wt. % of the catalytic composite. The method of manufacturing the catalytic composite comprises contacting a molecular sieve with a metal chelate, a quaternary ammonium hydroxide, and a mixture of alkali metal hydroxide and at least one solvent selected from the group consisting of water and alcohols with fewer than 6 carbon atoms, the alkali metal hydroxide comprising a sufficient portion of said mixture such that said alkali metal hydroxide comprises at least about 10 wt. % of said resulting catalytic composite. The method of treating sour petroleum distillates comprises contacting the distillates at oxidation conditions with the catalytic composite described above.

24 Claims, No Drawings

CATALYTIC COMPOSITE, METHOD OF MANUFACTURE AND PROCESS FOR USE

BACKGROUND OF THE INVENTION

1. Field of the Invention

The field of art to which the claimed invention pertains is catalytic composites and process useful for treating sour petroleum distillates. More specifically, the claimed invention relates to catalysts and catalytic processes especially useful for the treatment of sour petroleum distillates to effect the oxidation of mercaptans in the distillate to disulfides.

2. Description of the Prior Art

Processes for treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. The oxidizing agent is most often air. Gasoline, including natural, straight run and cracked gasolines, is the most frequently treated sour petroleum distillate. Other sour petroleum distillates include the normally gaseous petroleum fraction as well as naphtha, kerosene, jet fuel, fuel oil, lube oil, and the like.

A commonly used continuous process for treating sour petroleum distillates entails treating the distillate in contact with a metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air. Sour petroleum distillates containing more difficultly oxidizable mercaptans are more effectively treated in contact with a metal chelate catalyst disposed on a high surface area adsorptive support—usually a metal phthalocyanine on an activated charcoal. The distillate is treated in contact with the supported metal chelate catalyst at oxidation conditions in the presence of an alkaline agent. One such process is described in U.S. Pat. No. 2,988,500. The oxidizing agent is most often air admixed with the distillate to be treated, and the alkaline agent is most often an aqueous caustic solution charged continuously to the process or intermittently as required to maintain the catalyst in a caustic-wetted state.

Heretofore, the practice of catalytically treating mercaptan-containing sour petroleum distillates has involved the introduction of alkaline agents, usually sodium hydroxide, into the sour petroleum distillate prior to or during the treating operation. (U.S. Pat. No. 3,108,081, U.S. Pat. No. 4,156,641.) The prior art also suggests the addition to the petroleum distillate along with certain alkaline agents of certain non-alkaline additives. (U.S. Pat. No. 4,124,493, U.S. Pat. No. 4,033,860.) In addition, the prior art suggests the use in an alkaline environment of certain catalytic composites produced from metal phthalocyanine solutions containing certain non-alkaline additives. (U.S. Pat. No. 4,087,378, U.S. Pat. No. 4,124,531.) The prior art also suggest the use of certain chemicals, including sodium hydroxide, to increase the solubility of metal phthalocyanine in aqueous solutions from which metal phthalocyanine catalysts to be used in alkaline environments are made. (U.S. Pat. No. 3,108,081.) The prior art does not disclose or suggest the treating of a mercaptan-containing sour petroleum distillate by contacting the distillate at oxidation conditions with an oxidizing agent and a catalytic composite comprising a metal chelate, an alkali metal hydroxide, and a quaternary ammonium hydroxide, disposed on a molecular sieve support. The catalytic composite of this invention can be used in the treating process of this invention with or without the necessity of addition of an alkaline agent. The consequent savings in materials handling and storage expenses, and avoidance of use of hazardous alkaline chemicals in the treating process, have been long desired.

SUMMARY OF THE INVENTION

It is a broad objective of my invention to present a novel catalytic composite and method for treating sour petroleum distillates.

In one of its broad aspects, the present invention embodies a catalytic composite comprising a metal chelate, an alkali metal hydroxide, and a quaternary ammonium hydroxide disposed on a molecular sieve support, said quaternary ammonium hydroxide represented by the structural formula:

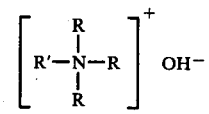

wherein R is a hydrocarbon radical containing up to about 20 carbon atoms and selected from the group consisting of alkyl, cycloalkyl, aryl, alkaryl and aralkyl, and R' is a substantially straight-chain alkyl radical containing from about 5 to about 20 carbon atoms, said alkali metal hydroxide comprising at least about 10 wt. % of said catalytic composite.

In another of its broad aspects, the present invention embodies a method of treating a mercaptan-containing sour petroleum distillate by contacting said distillate at oxidation conditions in the presence of an oxidizing agent with the catalytic composite described in the preceding paragraph.

In a third broad aspect, the present invention embodies a method of manufacturing a catalytic composite which comprises contacting a molecular sieve support with a metal chelate and a quaternary ammonium hydroxide represented by the structural formula:

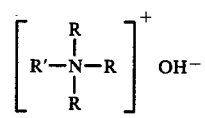

wherein R is a hydrocarbon radical containing up to about 20 carbon atoms and selected from the group consisting of alkyl, cycloalkyl, aryl, alkaryl and aralkyl, and R' is a substantially straight-chain alkyl radical containing from about 5 to about 20 carbon atoms, and with a mixture of alkali metal hydroxide and at least one solvent selected from the group consisting of water and alcohols with fewer than six carbon atoms, said alkali metal hydroxide being present in such amount that said alkali metal hydroxide comprises at least about 10 wt. % of said catalytic composite.

Other objects and embodiments of this invention will become apparent in the following detailed description.

DESCRIPTION OF THE INVENTION

The molecular sieves used in this invention may be any of various types. Molecular sieves are crystalline metal aluminosilicates with a three-dimensional interconnecting network structure of silica and alumina tetrahedra. The tetrahedra are formed by four oxygen atoms surrounding a silicon or aluminum atoms. Each oxygen atom has two negative charges and each silicon has four positive charges. This structure permits an ordered sharing arrangement, building tetrahedra uniforming in four directions.

In the crystalline structure, up to half of the quadrivalent silicon atoms can be replaced by trivalent aluminum atoms. By regulating the ratios of the starting materials, it is possible to produce molecular sieves containing different ratios of silicon to aluminum ions and different crystal structures containing various cations.

In the most common commercial molecular sieve, Type A, the tetrahedra are grouped to form a truncated octahedron with a silica or alumina tetrahedron at each point. This structure is known as a sodalite cage.

When sodalite cages are stacked in simple cubic forms, the result is a network of cavities approximately 11.5 A in diameter, accessible through openings on all six sides. These openings are surrounded by eight oxygen ions. In the sodium form, this ring of oxygen ions provides an opening "window" of 4.2 A in diameter into the interior of the structure. The soda form of this crystalline structure is represented chemically by the following formula:

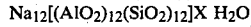

$$Na_{12}[(AlO_2)_{12}(SiO_2)_{12}] X\ H_2O$$

The water of hydration which fills the cavities during crystallization is loosely bound and can be removed by moderate heating. The number of water molecules in the structure can be as great as 27, making the water in the saturated formula 28.5% of the weight of the anhydrous molecular sieve. Molecular sieves can be readily produced with other metals substituting for a portion of the sodium.

The crystal structure of the Type X molecular sieve is built up by arranging the basic sodalite cages in a tetrahedral stacking with bridging across the six-membered oxygen atoms ring. These rings provide openings "windows" 9–10 A in diameter into the interior of the structure. The overall electrical charge is balanced by positively charged cation(s), as in the Type A structure. The chemical formula that represents the unit cell of Type X molecular sieve in the soda form is shown below:

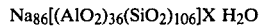

$$Na_{86}[(AlO_2)_{36}(SiO_2)_{106}] X\ H_2O$$

As in the case of the Type A crystal, water of hydration can be removed by moderate heating. The value of X can be as great as 276, making the water in this type of molecular sieve 35% of the weight of the anhydrous molecular sieve.

The preferred form of molecular sieve for this invention is a Type X molecular sieve. Especially preferred is an anhydrous Type X molecular sieve with a nominal pore size of 10 angstroms. Also especially preferred is a Type X molecular sieve of the soda form.

Any of the hydroxides of the metals of Group I-A of the Periodic Chart—the alkali metal hydroxides—can be used as a component of this invention. The alkali metal hydroxide component of this invention can be a single alkali metal hydroxide, or a mixture of two or more alkali metal hydroxides. The preferred alkali metal hydroxide for this invention is sodium hydroxide. Potassium hydroxide is also preferred. The alkali metal hydroxides are widely available commercially. They may be made by the electrolysis of aqueous alkali-salt solutions, usually the chloride salt, or by the hydration of alkali metal hydrides.

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g. cobalt tetrapyridinoporphyrazine; porphyrin and metaloporphyrin catalysts as described in U.S. Pat. No. 2,966,453, e.g. cobalt tetraphenylporphyrin sulfonate; corrinoid catalysts as described in U.S. Pat. No. 3,252,892, e.g. cobalt corrin sulfonate; chelate organometallic catalysts such as described in U.S. Pat. No. 2,918,426, e.g. the condensation product of an aminophenol and a metal of Group VIII; and the like. Metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g. cobalt phthalocyanine monosulfonate, cobalt phthalocyanine disulfonate or a mixture thereof being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The quaternary ammonium hydroxide component of the catalytic composite of this invention is represented by the structural formula:

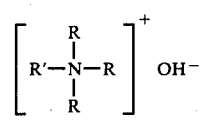

$$\left[ \begin{array}{c} R \\ | \\ R'-N-R \\ | \\ R \end{array} \right]^{+} OH^{-}$$

Wherein R is hydrocarbon radical containing up to about 20 carbon atoms and selected from the group consisting of alkyl, cycloalkyl, aryl, alkaryl and aralkyl and R' is a substantially straight-chain alkyl radical containing from about 5 to about 20 carbon atoms. It is preferred that one R radical be an alkyl radical containing from about 12 to about 18 carbon atoms, and another R radical be a benzyl radical. Preferred quaternary ammonium hydroxides thus include benzyldimethyldodecylammonium hydroxide, benzyldimethylteradecylammonium hydroxide, benzyldimethylhexadecylammonium hydroxide, benzyldimethyloctadecylammonium hydroxide, and the like. Other suitable quaternary ammonium hydroxides include dimethylcyclohexyloctylammonium hydroxide, diethylcyclohexyloctylammonium hydroxide, dipropylcyclohexyloctylammonium hydroxide, dimethylcyclohexyldecylammonium hydroxide, diethylcyclohexyldecylammonium hydroxide, dipropylcyclohexyldecylammonium hydroxide, dimethylcyclohexyldodecylammonium hydroxide, diethylcyclohexyldodecylammonium hydroxide, dipropycyclohexyldodecylammonium hydroxide, dimethylcyclohexyltetradecylammonium hydroxide, diethylcyclohexyltetradecylammonium hydroxide, dipropylcyclohexyltetradecylammonium hydroxide, dimethylcyclohexylhexadecylammonium hydroxide, diethylcyclohexylhexadecylammonium hydroxide, dipropylcyclohexylhexadecylammonium hydroxide, dimethylcyclohexyloctadecylammonium hydroxide, diethylcyclohexyloctadecylammonium hydroxide, dipropylcyclohexyloctadecylammonium hydroxide, and the like. Other suitable quaternary ammonium hydroxides are described in U.S. Pat. No. 4,156,641.

The alkali metal hydroxides and quaternary ammonium hydroxides of this invention, as well as the metal chelates, particularly the metal phthalocyanines, are readily disposed on the molecular sieve support. The alkali metal hydroxide may comprise at least about 10 wt. % of the catalytic composite. In the sweetening process herein contemplated, the alkali metal hydroxide will preferably comprise at least about 25 wt. % of the said composite and the quaternary ammonium hydroxide will comprise at least about 10 wt. % of said composite. In general, up to about 25 wt. % metal phthalocyanine can be adsorbed on the molecular sieve support and still form a stable catalytic composite. A lesser amount in the range of from about 0.1 to about 10 wt. % generally forms a suitably active catalytic composite.

The alkali metal hydroxide, the quaternary ammonium hydroxide, and the metal chelate components can be disposed on the molecular sieve support in any conventional or otherwise convenient manner. Said components can be disposed on said support simultaneously from a common aqueous or alcoholic mixture thereof, or separately and in any desired sequence. The disposition process can be effected utilizing conventional techniques whereby the support in the form of spheres, pills, pellets, granules or other particles of uniform or irregular size or shape, is soaked, suspended, dipped one or more times, or otherwise immersed in an aqueous or alcoholic mixture to dispose a given quantity of the alkali metal hydroxide, quaternary ammonium hydroxide, and metal chelate components thereon. One preferred method involves the use of a steam-jacketed rotary dryer. The molecular sieve support is immersed in the impregnating mixture contained in the dryer and the support is tumbled therein by the rotating motion of the dryer. Evaporation of the liquid in contact with the tumbling support is expedited by applying a flow of nitrogen through the dryer. In any case, the resulting composite is allowed to dry under ambient temperature conditions, or dried at an elevated temperature in an oven, or in a flow of hot gases, or in any other suitable manner.

An alternative and convenient method for disposing the alkali metal hydroxide, quaternary ammonium hydroxide, and metal chelate components on the molecular sieve support comprises predisposing the support in a sour petroleum distillate treating zone or chamber as a fixed bed and passing the alkali metal hydroxide-metal chelate-quaternary ammonium hydroxide mixture through the bed in order to form the catalytic composite in situ. This method allows the mixture to be recycled one or more times to achieve a desired concentration of the alkali metal hydroxide, quaternary ammonium hydroxide, and metal chelate components on the molecular sieve support. In still another alternative method, the molecular sieve may be predisposed in said treating zone or chamber, and the zone or chamber thereafter filled with the mixture of alkali metal hydroxide, metal chelate, and quaternary ammonium hydroxide to soak the support for a predetermined period.

Another alternative for disposing the alkali metal hydroxide, quaternary ammonium hydroxide, and metal chelate components on the molecular sieve support comprises use of a quaternary ammonium salt instead of the quaternary ammonium hydroxide. The quaternary ammonium salt can be admixed with the alkali metal hydroxide and metal chelate to form a common aqueous or alcoholic mixture which can be used as indicated in the previous two paragraphs. Alternatively, one quaternary ammonium salt can be predisposed on the molecular sieve support by any conventional or otherwise convenient manner, and thereafter the alkali metal hydroxide and the metal chelate can be disposed on the molecular sieve support by any of the methods indicated in the previous two paragraphs. Suitable quaternary ammonium salts include halides, nitrates, nitrites, sulfates, phosphates, acetates, citrates, and tartrates, Halides are the preferred salts. Because the mixing of the molecular sieves and the alkali metal hydroxide is exothermic, it is preferred to perform the mixing by means which will maintain the temperature of the molecular sieves below their fracture point. Further, mixing and drying temperatures should be maintained below the temperature of thermal decomposition of the particular quaternary ammonium hydroxide being used. In general, quaternary ammonium hydroxides are subject to thermal decomposition at temperatures above 100° C.

In the process of sweetening a sour petroleum distillate, it has heretofore been the practice to oxidize the mercaptans contained therein in the presence of an alkaline agent. With respect to the method of this invention, those distillates containing the more readily oxidized mercaptans can be treated in the absence of added alkaline agent. A sour petroleum distillate is passed in contact with the catalytic composite of this invention. The catalytic composite can be dispersed within the distillate, or it can be disposed as a fixed bed in a container. The contacting can be batch-type, or continuous. A continuous treating operation using a fixed bed of the catalytic composite is preferred. An oxidizing agent, preferably air, is introduced to contact the distillate and the catalytic composite to provide at least the stoichiometric amount of oxygen required to oxidize the mercaptan content of the distillate. It may be preferable in treating distillates with high mercaptan content to contact the catalytic composite with an alkaline agent prior to contacting the distillate and the catalytic composite.

Treatment of sour petroleum distillates in contact with the catalytic composite of this invention can be performed in the presence of an alkaline agent as heretofore practiced, if desired. The catalytic composite is initially saturated with an alkaline agent, and an alkaline agent thereafter passed in contact with the catalyst bed, continuously or intermittently as required, admixed with the sour petroleum distillate. Any suitable alkaline agent may be employed. An alkali metal hydroxide in an aqueous solution, e.g. sodium hydroxide in aqueous solution, is most often employed. The solution may further comprise a solubilizer to promote mercaptan solubility, e.g. alcohol, and especially methanol, ethanol, n-propanol, isopropanol, etc., and also phenols, cresols, and the like. The solubilizer, when employed, is preferably methanol, and the alkaline solution may suitably comprise from about 2 to about 100 vol. % thereof. Sodium hydroxide and potassium hydroxide constitute the preferred alkaline agents. Others including lithium hydroxide, rubidium hydroxide and cesium hydroxide are also suitably employed.

The method of treating of this invention can be effected in accordance with prior art treating conditions. The process is usually effected at ambient temperature conditions, although higher temperatures up to about 105° C. are suitably employed. Pressures of up to about 1,000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. In fixed bed treating operations, the sour petroleum distillate may be passed upwardly or downwardly through the catalytic composite. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

As heretofore mentioned, the alkali metal hydroxide, quaternary ammonium hydroxide, and metal chelate components of the catalytic composite of this invention are readily adsorbed on the molecular sieve support. Thus, any of the said components which may in time be leached from the support and carried away in the reactant stream can be easily restored to the catalytic composite in situ by introducing either or any of said components to the sweetening process, for example, in admixture with the distillate being treated to be disposed on the support in the treating zone.

The following examples are presented in illustration of certain preferred embodiments of this invention and are not intended as undue limitations on the generally broad scope of the invention as set out in the appended claims.

EXAMPLE I

In this example, an actuated charcoal supported cobalt phthalocyanine monosulfonate catalyst was prepared in accordance with prior art practice by adsorbing the cobalt phthalocyanine monosulfonate on an activated charcoal support from a methanolic dispersion thereof. Thus, 150 mg. of cobalt phthalocyanine monosulfonate was admixed with 50 ml. of methanol and stirred for about 5 minutes. The resulting dispersion was then further diluted to 300 ml. with methanol with an additional 5 minutes of stirring. About 100 cc. of the activated charcoal particles, having an average bulk density of about 0.25 gm/cc and a particle size in the 10×30 mesh range, was immersed in the methanol dispersion, and the dispersion was stirred in contact with the particles for about 5 minutes and then maintained in contact with the particles for 1 hour under quiescent conditions. The methanolic dispersion was thereafter evaporated to dryness over a steam bath in contact with the charcoal particles, and the resulting particles were subsequently oven dried at 100° C. for 1 hour.

EXAMPLE II

This example illustrates one embodiment of this invention. A 50 wt. % solution of isopropyl alcohol and dimethyl benzyl-n-alkylammonium chloride was prepared. The dimethylbenzyl-n-alkyl-ammonium chloride comprised dimethylbenzyldodecylammonium chloride (61%), dimethylbenzyltetradecylammonium chloride (23%), dimethylbenzylhexadecylammonium chloride (11%), and dimethylbenzyloctadecylammonium chloride (5%). About 100 cc. of clean, dry 8×12 mesh molecular sieves were admixed with 10 wt. % of the foregoing substituted ammonium chloride. The molecular sieves were of the X-type, with an alumina-silicate base and an average pore size of 10 Angstroms. The cation was sodium. The molecular sieves were maintained in contact with the substituted ammonium chloride for approximately 60 minutes. The admixture was thereafter evaporated to dryness over a steam bath to form a composite. Thereafter, a mixture of 150 mg. of cobalt phthalocyanine monosulfonate and 150 ml. of 7 wt. % aqueous sodium hydroxide was admixed with the aforesaid composite. The composite was maintained in contact with the aforesaid mixture for approximately 60 minutes. The resulting admixture was thereafter evaporated to dryness with a vacuum apparatus to form one embodiment of the catalytic composite of this invention.

EXAMPLE III

A comparative evaluation of the catalytic composite of the foregoing Example I and Example II was effected in the following manner. This example illustrates another embodiment of this invention. In each case, 100 cc. of the catalyst was disposed as a fixed bed in a vertical glass tubular reactor maintained at ambient temperature conditions—about 80° to 85° F. Air was charged to the system through a rotameter at about 200 cc. per hour and admixed with a sour kerosene feedstock. The kerosene feedstock contained 1028 ppm. mercaptan sulfur. The mixture was processed downwardly through the catalyst bed at a liquid hourly space velocity of about 1 over a 20 hour period. The reactor effluent was monitored and analyzed periodically for mercaptan sulfur.

The Table below sets forth the results of the foregoing examples. Run I corresponds to the run of Example III wherein the catalytic composite of Example I was used. Run II corresponds to the run of Example III wherein the catalytic composite of Example II was used.

TABLE

| Time, Hrs. | Mercaptan Sulfur, wt. ppm. | |
|---|---|---|
| | Run I | Run II |
| 0 | 1028 | 1028 |
| 1 | 372 | 158 |
| 5 | 475 | 118 |
| 10 | 500 | 161 |
| 15 | 496 | 181 |
| 20 | 500 | 291 |

The above results clearly indicate the superiority of the catalytic composite of this invention over a catalytic composite prepared in a conventional manner. The catalytic composite of Example II was more effective than the catalytic composite of Example I in treating a sour petroleum distillate.

I claim as my invention:

1. A catalytic composite comprising a metal chelate, an alkali metal hydroxide, and a quaternary ammonium hydroxide disposed on a molecular sieve support, the quaternary ammonium hydroxide represented by the structural formula:

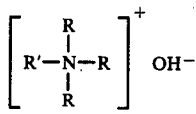

wherein R is a hydrocarbon radical containing up to about 20 carbon atoms and selected from the group consisting of alkyl, cycloalkyl, aryl, alkaryl and aralkyl, and R' is a substantially straight-chain alkyl radical containing from about 5 to about 20 carbon atoms, said alkali metal hydroxide comprising at least about 10 wt. % of said catalytic composite.

2. The catalytic composite of claim 1 wherein said molecular sieve is a Type X molecular sieve.

3. The catalytic composite of claim 1 wherein said molecular sieve is a Type X molecular sieve of the soda form.

4. The catalytic composite of claim 1 wherein said alkali metal hydroxide comprises at least about 20 wt. % of said catalytic composite.

5. The catalytic composite of claim 1 wherein said alkali metal hydroxide comprises at least 20 wt. % of said catalytic composite and said quaternary ammonium hydroxide comprises at least 10 wt. % of said catalytic composite.

6. The catalytic composite of claim 1 wherein said alkali metal hydroxide is sodium hydroxide.

7. The catalytic composite of claim 1 wherein said alkali metal hydroxide is potassium hydroxide.

8. The catalytic composite of claim 1 wherein said quaternary ammonium hydroxide is dimethylbenzylalkylammonium hydroxide.

9. The catalytic composite of claim 1 wherein said metal chelate is a metal phthalocyanine.

10. The catalytic composite of claim 1 wherein said metal chelate is cobalt phthalocyanine.

11. The catalytic composite of claim 1 wherein said metal chelate is cobalt phthalocyanine monosulfonate.

12. The catalytic composite of claim 1 wherein said metal chelate is vanadium phthalocyanine.

13. A method of manufacture of a catalytic composite which comprises contacting a molecular sieve with a metal chelate, a quaternary ammonium hydroxide, and a mixture of alkali metal hydroxide and at least one solvent selected from the group consisting of water and alcohols with fewer than 6 carbon atoms, at a temperature below the temperature of decomposition of said quaternary ammonium hydroxide, said alkali metal hydroxide present in said mixture in such amount that said alkali metal hydroxide comprises at least about 10 wt. % of said catalytic composite, and said substituted ammonium compound represented by the structural formula:

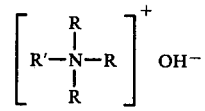

wherein R is a hydrocarbon radical containing up to about 20 carbon atoms and selected from the group consisting of alkyl, cycloalkyl, aryl, alkaryl and aralkyl, R' is a substantially straight-chain alkyl radical containing from about 5 to about 20 carbon atoms.

14. The method of claim 13 wherein said molecular sieve is a Type X molecular sieve.

15. The method of claim 13 wherein said molecular sieve is a Type X molecular sieve of the soda form.

16. The method of claim 13 wherein said alkali metal hydroxide comprises at least about 20 wt. % of said catalytic composite.

17. The method of claim 13 wherein said alkali metal hydroxide comprises at least 20 wt. % of said catalytic composite and said quaternary ammonium hydroxide comprises at least 10 wt. % of said catalytic composite.

18. The method of claim 13 wherein said alkali metal hydroxide is sodium hydroxide.

19. The method of claim 13 wherein said alkali metal hydroxide is potassium hydroxide.

20. The method of claim 13 wherein said quaternary ammonium hydroxide is dimethylbenzylalkylammonium hydroxide.

21. The method of claim 13 wherein said metal chelate is a metal phthalocyanine.

22. The method of claim 13 wherein said metal chelate is cobalt phthalocyanine.

23. The method of claim 13 wherein said metal chelate is cobalt phthalocyanine monosulfonate.

24. The method of claim 13 wherein said metal chelate is vanadium phthalocyanine.

* * * * *